United States Patent [19]

Krull

[11] 4,228,442
[45] Oct. 14, 1980

[54] MEANS FOR PREVENTING DRYING OF INK AT NOZZLES OF PRINT HEADS

[75] Inventor: Felix B. Krull, Leitershofen near Augsburg, Fed. Rep. of Germany

[73] Assignee: NCR Corporation, Dayton, Ohio

[21] Appl. No.: 6,312

[22] Filed: Jan. 24, 1979

[51] Int. Cl.³ ............................................. G01D 15/18
[52] U.S. Cl. ................................................ 346/140 R
[58] Field of Search ............................. 346/75, 140 R

[56] References Cited

U.S. PATENT DOCUMENTS

| | | | |
|---|---|---|---|
| 3,346,869 | 10/1967 | Stone | 346/75 |
| 3,737,914 | 6/1973 | Hertz | 346/75 |
| 3,839,721 | 10/1974 | Chen | 346/75 |
| 4,106,032 | 8/1978 | Miura | 346/140 R |

FOREIGN PATENT DOCUMENTS 2519160   9/1976   Fed. Rep. of Germany .......... 346/140

*Primary Examiner*—Joseph W. Hartary
*Attorney, Agent, or Firm*—J. T. Cavender; Wilbert Hawk, Jr.; George J. Muckenthaler

[57] ABSTRACT

An ink jet print head has at least one nozzle for ejecting ink droplets and includes an adjacent chamber containing liquid ink solvent therein. An absorbent material member is positioned to have one end thereof in the chamber-containing solvent and is directed or trained to an area which is in front of or around the nozzle to carry fluid or vapor therearound for the purpose of providing a moist or humid atmosphere at the nozzle and thereby prevent drying of the ink.

15 Claims, 6 Drawing Figures

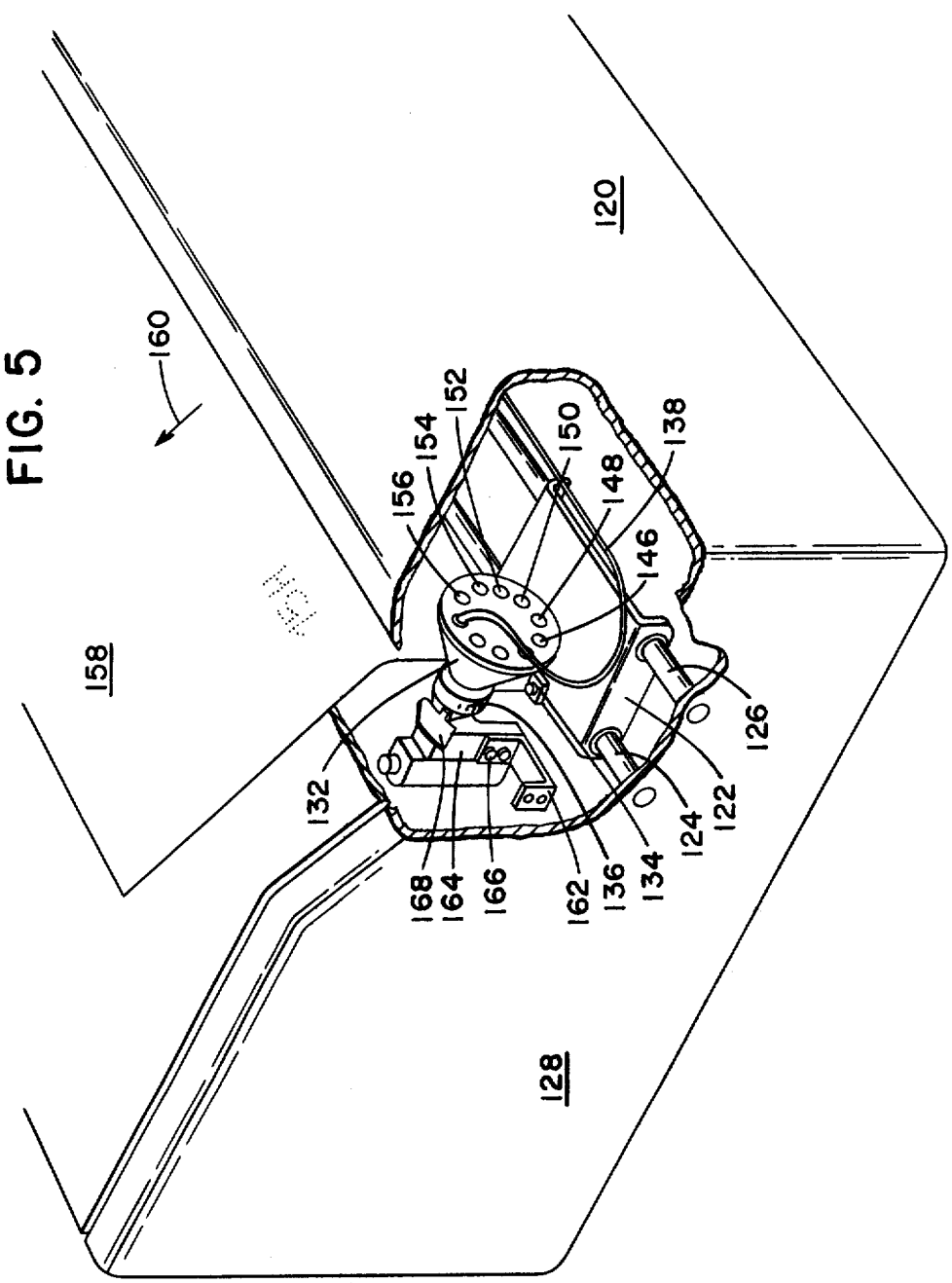

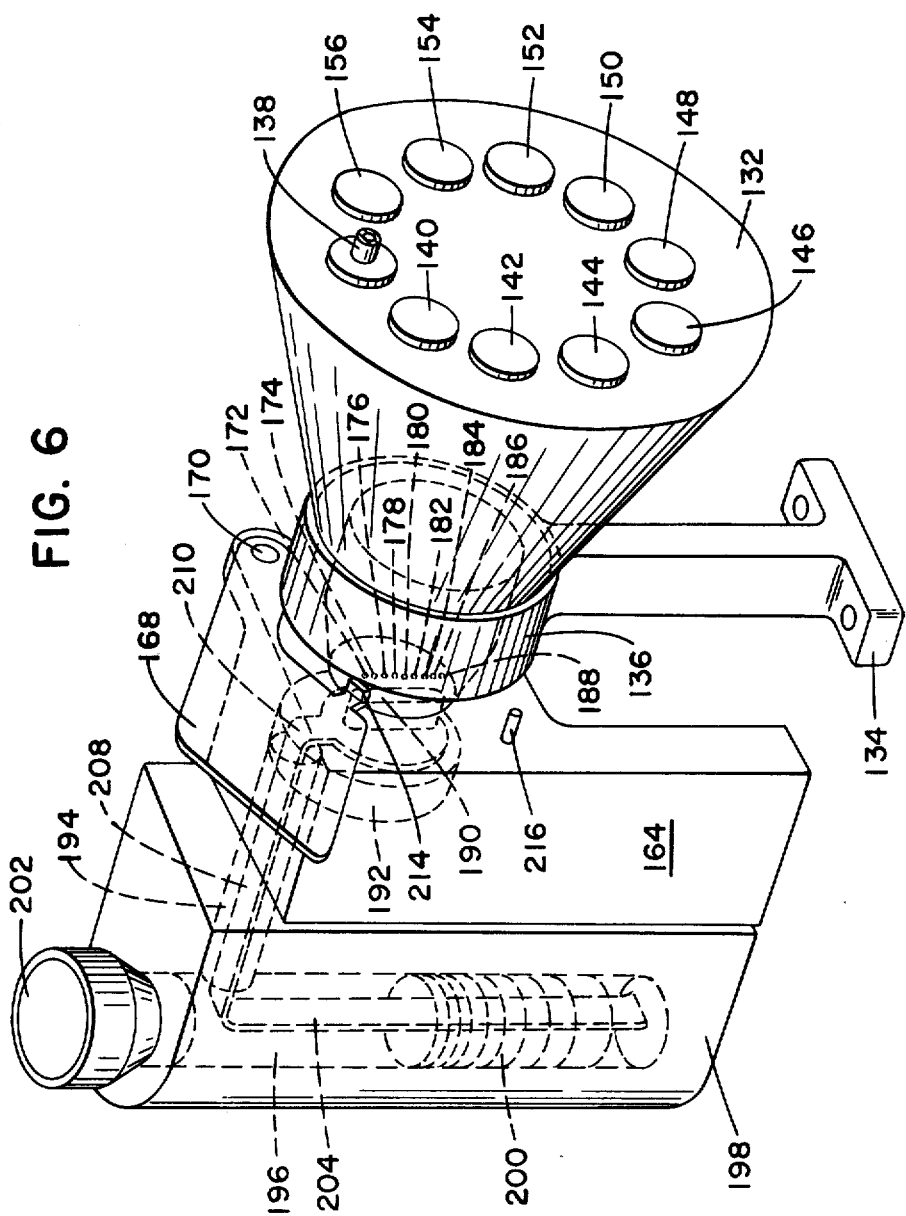

4,228,442

MEANS FOR PREVENTING DRYING OF INK AT NOZZLES OF PRINT HEADS

BACKGROUND OF THE INVENTION

In the field of ink jet printing, it is of prime importance that the ink droplets be ejected in rapid manner for high speed operation while maintaining the ink droplets in a condition which allows the droplets to dry upon contact with the record medium so as to avoid smearing of the ink, and at the same time keep the droplets in a wet condition so as to prevent drying of the droplets at the print head nozzle. The nozzle may become clogged by reason of inactivity or intermittent periods of operation or by use of a "dry" ink.

Certain inks having a slow-drying characteristic have been used in print heads along with the use of absorbent-type paper so that the paper can take care of part of the problem of the slow-drying ink. A disadvantage of the use of such slow-drying ink and absorbent paper is that the behavior of the ink and paper causes irregular dot patterns and distorted characters.

In the case of machine-readable characters such as certain bar codes used on high-quality papers as labels and vouchers, it has been common to use the quick-drying inks developed on the basis of organic solvents such as ketone or alcohol. However, such inks having an organic solvent base tend to dry, crust or thicken at the nozzle of the print head or within the print head itself, whereby the operation of the printing unit is impaired or otherwise affected.

Representative prior art in the area of conditioning the ink in an ink jet printer is shown in German Pat. No. 2,428,460, issued to IBM Corporation, corresponding, to U.S. Pat. No. 3,839,721 issued to W. H. Chen et al. on Oct. 1, 1974 which printer provides a tub that is filled with a vapor-generating liquid and is slidable in relation to the print head. During pauses in printing or non-printing, the nozzles are caused to be exposed to the vapor or to the liquid movement of the tub therepast so as to prevent the ink from drying in the nozzles.

U.S. Pat. No. 3,346,869 issued to J. J. Stone on Oct. 10, 1967 shows a nozzle cover or pad having a silicone coating with the pad being movable over the nozzle to prevent the ink from drying and also to serve as a lubricant for the tip of the nozzle.

U.S. Pat. No. 3,596,275 issued to R. G. Sweet on July 27, 1971 discloses a fluid droplet recorder having a reservoir of rinse water controlled by a valve to wash any residual ink from the nozzle when the recording operation is stopped.

SUMMARY OF THE INVENTION

The present invention relates to an ink jet print head, and more particularly, to such a print head which includes a drive element actuated to cause the ejection of ink droplets from the nozzle of the print head. The print head may include a single nozzle or a plurality of nozzles depending upon the particular arrangement and construction of the desired printing or recording apparatus. The ink which is used in the printing apparatus should have a quality which optimizes both the wetness and the dryness of the ink wherein the ink droplets become dry upon contact with the record medium and at the same time are kept sufficiently wet to prevent drying of the droplets at the nozzle or of the ink within the print head itself.

While temperature and humidity are factors to be considered when making the ink and when operating the recording apparatus, it is seen that operating conditions vary and that the composition of the ink depends upon an atmosphere which is considered to be an optimum condition. The ink which consists essentially of a base and a dye may have additional base material provided or brought into the area around the nozzles so as to present a wet or humid condition or atmosphere and thereby prevent ink from drying at the nozzles while allowing the ink droplets to dry upon contact with the record medium.

Absorbent or wick-like material is disposed partly in a liquid ink solvent and through a portion of the wick material the solvent is carried to and evaporates in a chamber or room provided in front of or around the nozzles so that the atmosphere or area therearound is enriched or saturated with the solvent to prevent drying or thickening of the ink at the nozzles.

In view of the above discussion, the principal object of the present invention is to provide means for enriching or saturating the atmosphere surrounding the nozzle(s) of an ink jet print head.

An additional object of the present invention is to provide means for carrying a quantity of solvent to the surrounding area of the print head nozzle(s) for permitting evaporation of the solvent around the nozzle(s).

Another object of the present invention is to provide an ink container adjacent the print head and an ink-carrying member in a path from such container to the area around the print head nozzle(s).

A further object of the present invention is to provide a member of wick-like material for carrying liquid ink solvent from a container to the area surrounding the nozzle(s) of a print head and permitting evaporation around the head for the purpose of maintaining the ink at the nozzle(s) in a wet or moist condition.

Additional advantages and features of the present invention will become apparent and fully understood from a reading of the following description taken with the annexed drawing.

BRIEF DESCRIPTION OF THE DRAWING

FIG. 5 illustrates a third embodiment of the invention arranged with a multiple nozzle ink jet print head; and FIG. 6 is an enlarged view of the print head shown in FIG. 5.

DESCRIPTION OF THE PREFERRED EMBODIMENT

Figure 1:
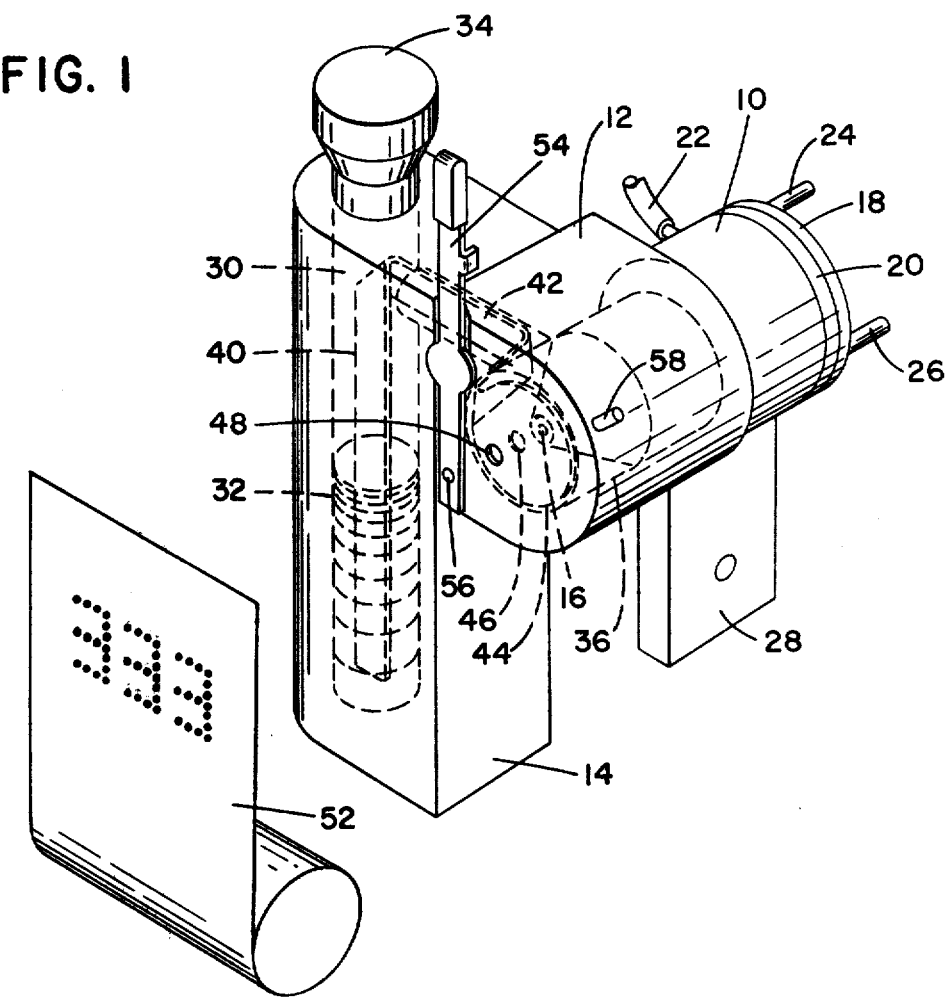
FIG. 1 is a diagrammatic perspective view of a single nozzle ink jet print head incorporating the subject matter of the present invention.

Referring to the drawing, FIG. 1 shows a perspective view in diagrammatic form of a single nozzle ink jet print head 10 having a housing element 12 arranged on the front portion of the head and connected to a solvent container 14. The print head 10 comprises a nozzle 16, a drive element consisting of a piezoelectric crystal 18 and a membrane 20, and an ink supply line 22. The electrical control of the piezoelectric crystal 18 occurs through the connection lines 24 and 26, which are connected to a source of supply voltage (not shown). The manner of functioning and the principle of operation of an ink jet print head is hereinafter further explained in connection with the detailed description of another figure of the drawing. The print head 10 can be fastened or secured by means of a support bar 28 or other generally-known fastening element in usual manner to the carriage of a printer that is also further shown in another figure of the drawing.

Figure 2:
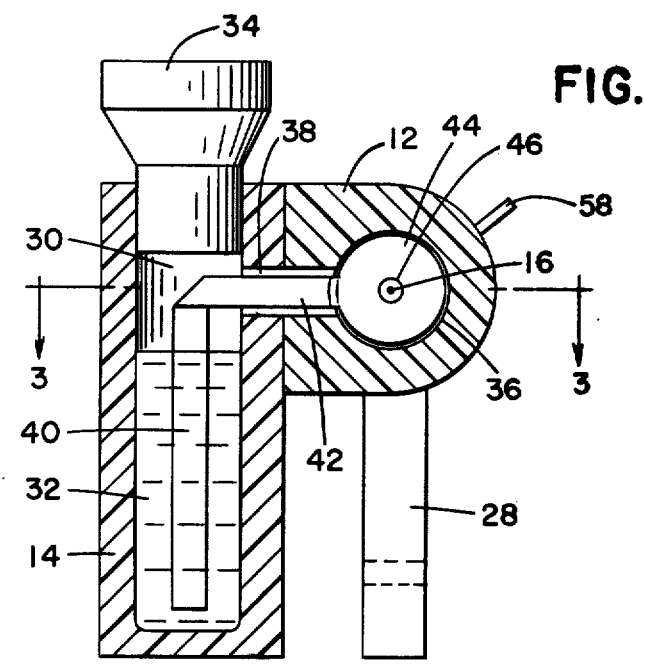
FIG. 2 is a vertical cross-sectional view taken along the line 2—2 in FIG. 3.
Figure 3:
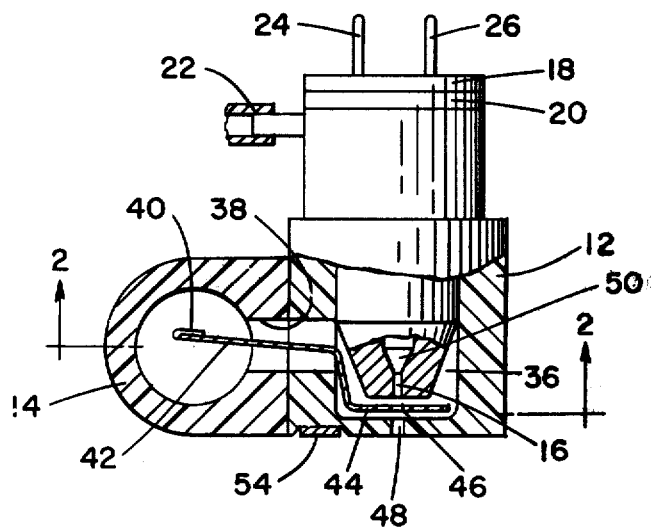
FIG. 3 is a top view and partially cross-sectional view of the ink jet print head of FIG. 1 as seen along the line 3—3 in FIG. 2.

The solvent container 14 includes a chamber 30 which can be filled with solvent 32 through a suitable opening and the chamber can be closed by a suitable plug 34 to prevent the solvent from flowing out or spilling. The solvent container 14 preferably consists of a transparent plastic material so that the stock solvent 32 readily available in the container can be optically controlled in a simple manner. The solvent 32 may consist of an ink base or like fluid which can be carried by wick-like material and allowed to evaporate in an area or zone of the housing element 12 around the nozzle 16 of the print head 10. The housing element 12 contains an evaporation room 36 which is connected to the chamber 30 of the solvent container 14 by way of a channel 38 which is directed in a path from the container 14 to the room 36, and which is best seen in FIGS. 2 and 3.

According to the present invention, a wick-like material, which may consist of absorbent paper, textile, felt or other material, having the properties which are capable of capillary action, is utilized to carry or transport solvent from the container 14 into the evaporation room 36. As seen in FIGS. 1, 2 and 3, a wick 40 has the lower portion thereof immersed in the solvent 32 and extends therefrom with a wick portion 42 through the channel 38 and assumes a path into the evaporation room 36 such that a circular end portion 44 of the wick 40 is disposed in front of the nozzle 16 of the print head 10. As illustrated, the end portion 44 of the wick 40 has an opening 46 which is larger than the nozzle 16. A further and somewhat smaller opening 48 is provided in the front wall of the housing element 12 (FIG. 3) with such opening 48 likewise having a larger diameter than the nozzle 16. The nozzle 16 and the openings 46 and 48 are in alignment with one another so that the ink droplets ejected through the nozzle channel 50 (FIG. 3) and the nozzle 16 can readily pass through the openings 46 and 48 without contact between the ink droplets and the openings, and thereby such ink droplets can impact on a record medium 52 (FIG. 1) which is appropriately arranged and positioned in front of the nozzle 16.

By suitable dimensioning of the diameter or of the size and the length of the connecting channel 38, the passing of the solvent 32 from the chamber 30 and into the evaporation room 36 can be insured and the positioning of the wick circular end portion 44 also eliminates the danger of the solvent leaving the evaporation room 36 through the opening 48. Through the arrangement of the wick 40 as it is described above, the solvent 32 covers the lower half of the wick 40 and due to the capillary action or the absorbency of the wick material, the solvent is drawn through the wick portion 42 to the wick end portion 44 from where the ink base or solvent can readily evaporate into the evaporation room 36. The dimensioning of the evaporation room 36 and the wick 40, and in particular the wick end portion 44, allows the necessary solvent vapor concentration to be produced in the evaporation room 36 in a simple manner and which concentration is compatible with the environmental conditions in which the printer is operating. The enriched or saturated solvent atmosphere in providing a medium of gaseous nature from the evaporating ink fluid base and which medium is always available at the nozzle 16 thus prevents a drying, crusting or thickening of the ink at such nozzle and also prevents premature drying of the droplets on the record medium 52. The ink droplets are available in a moist or wet condition at the nozzle 16 of the print head 10 so that the print head can always function free of trouble and therefore is always ready for operation. It is especially advantageous that the means for preventing drying of the ink at the nozzle 16 of the print head 10 always remains operable during both printing and non-printing time whenever the printer is operating.

It is a matter of concern that a certain quantity of the evaporated solvent 32 may escape from the evaporation room 36 around the nozzle 16 of the print head 10. This evaporation can be substantially prevented by means of a manually-operable closing lever 54 (FIG. 1) which is provided to be pivotable on a pin 56 against the action of a spring (not shown). As understood from FIG. 1, such lever may be drawn forward from a recess and rocked on the pin 56 toward the right (clockwise) and against a stop pin 58 whereby the opening 48 in the front wall of the housing element 12 is covered by the lever. An escape of the solvent in the atmosphere from the evaporation room 36 is thus prevented so that there is no unnecessary solvent consumption during the longer pauses in printer apparatus operation.

Figure 4:
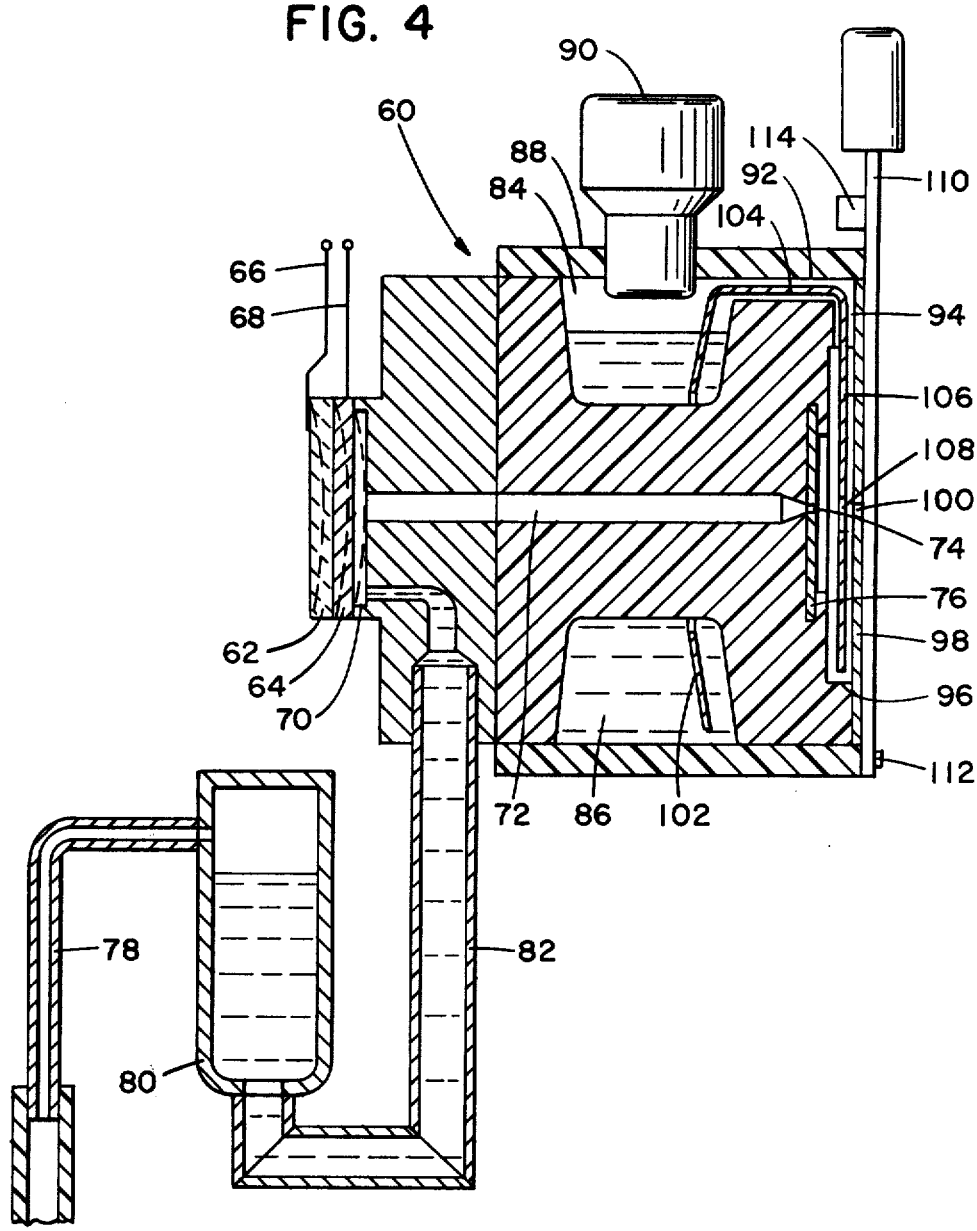
FIG. 4 is a diagrammatic cross-sectional view of a second embodiment of the invention in an ink jet print head.

FIG. 4 is a diagrammatic cross-sectional view of an embodiment of the invention with the solvent container and the evaporation room being included as an integral part of an ink jet print head 60. The single nozzle ink jet print head 60, as seen in FIG. 4, has a piezoelectric crystal 62 and a membrane 64 connected thereto and operating as a drive element for droplets of ink from the print head nozzle with energization of the crystal 62 taking place through the lines 66 and 68 which are supplied from a source of voltage. This energization causes the crystal 62 and the membrane 64 to bend or deflect into a capillary pressure cavity 70 whereby the ink contained in the cavity is forced through a nozzle channel 72 and is ejected in the form of an ink droplet through the nozzle 74 which is fixed in a nozzle plate 76. At a suitable position in front of the nozzle 74 (to the right of the print head 60 shown in FIG. 4) there may be positioned a record medium to be printed. The capillary pressure cavity 70 is supplied with ink in known manner from a supply container and the ink is carried through an ink supply line 78, an intermediate container 80, and a supply line 82 to the cavity 70.

In the application of the principle underlying the present invention, there is provided a recess 84 around the cylindrical print head 60 which contains solvent 86, the recess 84 being covered by a cover 88 which includes an opening for entrance of the solvent and which opening can be closed by a stopper 90. From the solvent supply container or recess 84 there leads a horizontal channel portion 92 and a vertical channel portion 94 to the front of the print head 60. The front of the print head also has an evaporation cavity 96 forward of the nozzle 74 and which is closed by a cover plate 98. The cover plate 98 has an opening 100 preferably larger than the opening of the nozzle 74. The print head 60 has a wick 102 in the recess 84 and which is placed in the solvent 86 with the wick having a portion 104 directed forward through the channel portions 92 and 94 and into the evaporation cavity 96, whereby an end portion 106 of the wick 102 is positioned in front of the nozzle 74. The wick portion 106 also contains an opening 108 which is larger than the opening of the nozzle 74. With the nozzle 74 being aligned with the opening 108 and with the opening 100 in the cover plate 98, the droplets of ink which eject from the nozzle 74 can thus pass through the openings 108 and 100 without contacting the edges thereof during the printing operation. According to the above-described principle of the present invention, it is through the wick 102 that the solvent 86 reaches the evaporation room or cavity 96 so that a saturated atmosphere of solvent material develops in the cavity and prevents the ink from drying at the nozzle 74.

If the print head 60 is not going to be used for a certain period of time, to avoid unnecessary loss of the solvent 86 the opening 100 can be covered by a manually-operable lever 110 which is rockable on a pin 112 until an abutment 114 of the lever is moved to engage with a stop member (not shown).

Instead of the single nozzle print head 10 shown in FIGS. 1, 2 and 3, there can also be used a multiple nozzle print head whereby the openings in an adjacent fluid containing element and in the portion of a wick or other like fluid carrying member would have to be extended or enlarged in a slot-shaped form or the like in order to accommodate the plurality of nozzles. FIGS. 5 and 6 show a simplified diagrammatic representation of a printer 120 wherein a carriage 122 is positioned to be movably carried on two guide bars 124 and 126 supported between a left side wall 128 and a right side wall (not shown). The carriage 122 has fastened hereto a support 136 by means of a pedestal 134 to carry a multiple nozzle print head 132 which is provided with ink through the supply line 138. The print head 132 includes a plurality of drive elements 140, 142, 144, 146, 148, 150, 152, 154 and 156. During the printing operation wherein the print head 132 is carried by the reciprocating movement of the carriage 122 on the guide bars 124 and 126, a record medium 158 is imprinted by ejection of ink droplets thereon and the medium is then transported or moved in the direction of the arrow 160 (FIG. 5).

The printer side wall 128 is cut out in FIG. 5 to show that a bail 162 is secured to the inner side of the wall for supporting a housing element 164 in fixed position by means of screws 166. When the print head 132 is moved to its left or rest position by movement of the carriage 122, a cover plate 168 is automatically engaged by an edge portion of support 136 and is caused to be rocked thereby in the clockwise direction about a pin 170, which action causes nozzles 172, 174, 176, 178, 180, 182, 184, 186 and 188 of the print head to be positioned in front of a slot-shaped opening 190 provided in the housing element 164. As the print head 132 is moved toward the right in FIG. 5 along the guide rails 124 and 126, the force of gravity causes the cover plate 168 to swing counterclockwise and cover the slot-shaped opening 190. As illustrated in FIG. 6, such housing element 164 also contains an evaporation room 192. The room 192 is connected through a channel 194 to a solvent chamber 196 which is provided in a container element 198 adjacent the housing element 164.

The solvent chamber 196 is filled with a solvent 200 which can be poured therein through an opening provided at the upper part of the element 198 after which the opening can be closed by a stopper 202. The solvent 200 has a wick 204 immersed therein and which extends through the channel 194 and transports the solvent by means of a horizontal wick portion 208 through a vertical wick portion 210 and into the evaporation room 192 wherein a solvent saturated atmosphere is provided and which reaches the nozzles 172-188 by way of the slot opening 190.

The opening 190 can be covered by the cover plate 168 which is rockable on the pin 170 so that solvent cannot emerge from the slot opening if the print head 132 is moved to the right. The plate 168 is rocked sideways upon approaching of the front part of the print head 132 from the right and pushes against the projection 214 so that the nozzles 172-188 can be positioned directly in front of the slot 190. If the print head 132 is operated and moved to the right, then the cover plate 168 contacts the stop 216 due to the effect of gravity and thereby covers the slot-shaped opening 190.

The embodiment of the present invention as shown in FIGS. 1, 2, and 3, when compared with the embodiment shown in FIGS. 5 and 6, may have the advantage of shorter printing pauses during the printing operation so that there exists a lesser chance for the ink to dry at the nozzles. In case extremely quick drying inks are not used, the arrangement according to FIGS. 5 and 6 may be sufficient by reason of the fact that at a longer non-use or printing pause, the print head 132 can be guided into the left position by appropriate or generally-known control mechanisms. The principle of the present invention as described herein can thus be used in both a single nozzle print head and in multiple nozzle print heads.

It is thus seen that herein shown and described is mechanism for preventing drying of the ink at the nozzles of print heads by providing a humid or moist atmosphere at the nozzles. While several embodiments of the invention have been disclosed herein, variations thereof may occur to those skilled in the art. It is contemplated that all such variations not departing from the spirit and scope of the invention hereof are to be construed in accordance with the following claims.

What is claimed is:

1. An ink jet print head having at least one nozzle through which pass droplets of ink onto a receiving medium,
    means associated with said print head capable of holding a quantity of liquid ink solvent,
    means adjacent said nozzle providing an area of atmosphere for a medium of gaseous nature, and
    wick means having capillaric action properties and having a portion immersed in said liquid ink solvent and another portion extending from said liquid ink solvent to and around said nozzle in said area of atmosphere for carrying said solvent to said area enabling evaporation of said solvent in said area for providing an enriched atmosphere at said nozzle for maintaining the ink in a moist condition.

2. The ink jet print head of claim 1 wherein said means associated with said print head comprises a container adjacent thereto.

3. The ink jet print head of claim 1 wherein said means associated with said print head comprises a recessed portion thereof for containing said liquid.

4. The ink jet print head of claim 1 wherein said means adjacent said nozzle comprises a chamber for evaporation of said liquid ink solvent and having an aperture for passage of said droplets of ink.

5. The ink jet print head of claim 4 including cover means movable across said aperture for opening and closing thereof and of said chamber.

6. The ink jet print head of claim 1 wherein said liquid ink solvent carrying means comprises an elongated wick member.

7. The ink jet print head of claim 6 wherein said wick member includes a first portion immersed in said liquid ink solvent and an end portion forward of said nozzle and having an aperture therein for passage of said droplets of ink therethrough.

8. The ink jet print head of claim 6 wherein said wick member includes a first portion immersed in said liquid ink solvent, a central portion, and an end portion of circular form and having an aperture therein aligned with said nozzle.

9. In an ink jet print head having at least one nozzle for passage of droplets of ink therethrough, and means for maintaining said droplets of ink in a wet condition, comprising a container associated with said print head and having a quantity of liquid ink solvent therein, a chamber adjacent said nozzle and formed to provide space for a certain volume of gas therein, and wick means having one end portion thereof immersed in said liquid ink solvent and another portion extending from said container and into said chamber for carrying said solvent thereinto and around said nozzle for evaporation to provide a moist atmosphere at said nozzle.

10. In the ink jet print head of claim 9 including a passageway extending from said container to said chamber for containing said wick means.

11. In the ink jet print head of claim 9 wherein said container comprises a recessed portion of said print head.

12. In the ink jet print head of claim 9 wherein said wick means comprises a first portion immersed in said liquid ink solvent and an end portion of circular form surrounding said nozzle and having an aperture therein aligned with said nozzle.

13. In the ink jet print head of claim 9 wherein said chamber includes an aperture therein and there is provided cover means swingable across said aperture.

14. In the ink jet print head of claim 9 including a carriage for moving said print head into and out of association with said chamber for exposing said nozzle to said atmosphere.

15. In the ink jet print head of claim 9, wherein said chamber includes an elongated aperture therein for accommodating a plurality of nozzles in said print head.

* * * * *